Patented July 29, 1952

2,605,222

UNITED STATES PATENT OFFICE 2,605,222

FLUID FOR DRILLING WELLS

Gordon Kenneth Jones, Port of Spain, Trinidad, assignor to Shell Development Company, San Francisco, Calif., a corporation of Delaware No Drawing. Application October 24, 1949, Serial No. 123,307. In the Netherlands December 14, 1948

6 Claims. (Cl. 252—8.5)

This invention relates to the drilling of oil and gas wells and pertains more particularly to the use and composition of an improved oil-base or water-and-oil emulsion drilling fluid.

A prime requisite of a satisfactory drilling fluid is that it possess a preferably substantially thixotropic gel structure and good plastering or sheath-forming characteristics. That is, it must form on the walls of the borehole a mudsheath effectively preventing any appreciable fluid loss to the formation. Such loss is undesirable at any time during the drilling, being especially dangerous and objectionable when drilling through heaving formations such as shale, or when drilling into the producing zone, which may be contaminated and plugged by said fluid.

A further desirable characteristic of a drilling fluid is that it remain substantially stable after being contaminated with salt solutions, such, for example, as brines entering the borehole from the formation and becoming admixed with the drilling emulsion.

The compounding of drilling fluids of the oil-base type and the water-and-oil emulsion type is well known to the art of well drilling. The plastering component incorporated in these drilling muds is usually an asphalt and preferably one known to those skilled in the art as a "blown asphalt."

A serious disadvantage attached to the use of blown asphalts is that the resultant drilling fluids have poor plastering properties at high temperatures, such as 150° C. Thus, these drilling fluids cannot be used in drilling deep or high temperature wells without great loss of fluid to the formations traversed by the borehole. Additional disadvantages of blown asphalts are that some types thereof are not readily dispersible in oil and that the dispersions obtained are not always sufficiently thixotropic.

It is the primary object of this invention to provide an improved oil-base drilling fluid having excellent plastering properties even at very high temperatures, such as 150° C. or more.

It is also an object of this invention to provide an oil-base drilling fluid which possesses substantially thixotropic gel structure, and is therefore adapted to carry weighting materials and drill cuttings in suspension during drilling operations.

Another object of this invention is to provide a drilling fluid incorporating a plastering component which is readily dispersible in the suspending medium or liquid phase.

Another object of this invention is to provide a drilling fluid which is neither impaired by high temperatures nor affected by brine contamination to the same extent as ordinary drilling fluids.

These and other objects of this invention will be understood from the following description of the invention.

Briefly, the invention consists in the addition of polymerized asphaltic bitumens to drilling fluids of the oil-base type or of the water-and-oil emulsion type to give them the desired plastering properties. The asphalt used in the present invention is prepared prior to use in the drilling fluid by polymerization at relatively low temperatures in the presence of cross-linking agents or reactants promoting the polymerization. Preferably, polymerization is applied to the asphaltic materials obtained from the distillation of asphaltic base mineral oil. It is to be understood, however, that other asphalts may also be used.

When carrying out the polymerization at relatively low temperatures (relatively low as compared with the temperatures at which, for example, asphalt is blown) hardly any decomposition of the asphalt molecules will occur; the presence of the reactants referred to above promote the polymerization, whereby three-dimensional or highly branched macro-molecules are obtained. The size of these molecules must be such as to prevent entire insolubility in petroleum hydrocarbons on the one hand, and to ensure the possibility of obtaining a stable gel structure on the other hand, whereby good plastering properties of the drilling fluid are ensured by the presence of a sufficient amount of colloidal material.

Suitable reactants are phenols with activated OH-group, such as trinitrophenol, dinitrophenol, para-nitrophenol, dinitro-orthocresol, dinitronaphthol and para-phenol sulfonic acid; further naphthalene sulfonic acid, 4-amino-benzene sulfonic acid, naphthalene disulfonic acid, etc.

Good results are obtained by carrying out the polymerization in the presence of substances which have a quinoid structure or obtain such a structure during the reaction.

Other reactants or polymerizing agents which have been found to be particularly effective are non-volatile, non-alkaline earth metallic salts, such as, for example, the chlorides, sulfates, and carbonates of zinc, iron, copper, antimony and aluminum. The quantity of reactant used in modifying or polymerizing the asphalt may vary from 0.25 to 10% by weight, as desired, preferably 1 to 3%. While the heating of the asphalt and reactant is normally done in a vessel open to the atmosphere, the reaction may also be carried out with an inert gas such as nitrogen covering the materials, thus preventing any oxygen from coming in contact with the modified asphalt during its preparation.

The temperature at which the polymerization is carried out may vary from between about 150° C. to 350° C.; 200° C. generally being a suitable temperature.

The time of polymerization is dependent on both the type and amount of reactant present during the polymerization and the temperature at which it is carried out. The time may vary from ½ to 8 hours or more, most polymerizations being completed in from 2 to 4 hours.

While it is believed that modification of the asphaltic material in the above-described manner results in a polymerization of the asphalt, the applicant does not wish to advance any theories as to the exact reaction which takes place, and the terms "polymerized" and "polymerization" are used with this reservation in the present application and claims.

In compounding oil-base drilling fluids, the polymerized asphalt can be readily dispersed in the base liquid or in a suitable solvent, for example, gas or diesel oil. If desired, the asphalt can be mixed with a quantity of weighting material, ground and packed, and can be transported either in packages in dry form, or in drums, diluted with gas oil. When the polymerized asphalt is to be used in a water-and-oil emulsion the asphalt is preferably added to the oil phase prior to the emulsification.

Drilling fluids may comprise several components which commonly include a suspending component or medium, a suspended component, a plastering agent and an emulsifying and/or stabilizing agent. The suspending medium in the case of an emulsion of the present invention is formed of oil and water, and in the case of an oil-base drilling fluid, oil alone is used. The oil in either case may be in the form of any suitable non-aqueous liquid such as a mineral oil, diesel oil, fuel oil, kerosene, stove oil and the like. The blown asphalt is preferably added to the oil phase prior to emulsification, in relatively small quantities such as from 5 to 20% on the weight of the oil phase. A suspended component in the form of a weighting material is generally added in order to improve plastering to some extent and to add weight to the drilling emulsion to overcome any formation pressures encountered during drilling operations. Weighting materials commonly used are clay, crushed oyster shells, barites, hematite, magnetite, etc. However, for the purposes of the present invention the preferred weighting materials are those finely round or powdered weighting materials which have a greater tendency to be wetted by oil than by water. The weighting material may constitute a substantial portion by weight of the drilling emulsion, e. g. in the range of 20 to 60 per cent. In the case of drilling emulsion, 0.5 to 1% of a suitable emulsifying agent is also used, e. g. soaps of fatty acids, rosin acids, tall oil and the like.

Drilling fluids prepared according to the present invention are found to have a good gel structure, a moderate viscosity, an extremely thin filter cake and excellent plastering properties even at very high temperatures, for example, 150° C. The fluids are also very stable at elevated temperatures and are almost unaffected by impurities, such as water, particularly salt water originating from the earth layers.

It has also been found that by adding from approximately 2 to 5% of a natural asphalt to a drilling fluid prepared according to this invention that the thermo-stability of the drilling fluid is further increased, and the loss of the liquid phase at elevated temperatures is reduced to a very low value, without the viscosity being appreciably increased at room temperature.

It has further been found that, by adding a small quantity of naphthenic acids to a drilling fluid of the present invention, the loss of the liquid phase can be reduced to practically zero while the viscosity of the fluid is also reduced.

EXAMPLE I

A quantity of "straight-run" asphalt with a penetration of $\frac{5}{10}$ at 30° C. was heated to 250° C., after which 1% $ZnCl_2$, referred to the quantity of asphalt, was added as polymerizing reactant while stirring vigorously. The reaction time was 4 hours.

A drilling fluid was then prepared having the following composition:

13.5% by weight of asphalt polymerized in the above manner;
51.5% by weight of barytes;
35.0% by weight of gas oil.

The barytes and the asphalt were ground together to a fine powder; this powder was dispersed in the gas oil at 30° C.

The drilling fluid had a specific weight of 1.53 and a viscosity of 215 g. (Stormer). There was no loss of liquid at 30° C. and 7 kg./sq. cm. (15 minutes in Baroid test apparatus) and the loss of liquid at 80° C. and 35 kg./sq. cm. was 0.24 cub. cm. per sq. cm. Neither at 30° C. nor at 80° C. did a bottom sediment form; the top settling at 30° C. was nil and at 80° C. it was 0.16 cc. The top settling was measured by allowing a quantity of 300 cub. cm. of drilling fluid to stand for three days and by determining the volume of the oil which had separated.

EXAMPLE II

A polymerized asphalt was prepared with 2% by weight of 2-4-6-trinitrophenol as a polymerization reactant; the reaction temperature was 300° C.; and the reaction time 4 hours. The composition of the drilling fluid was:

10.6% by weight of polymerized asphalt;
53.2% by weight of barytes;
36.2% by weight of gas oil.

The drilling fluid was prepared in the same manner as described in Example I.

The drilling fluid had a specific weight of 1.55 and a viscosity of 235 g. Stormer. There was no loss of liquid at 30° C. and 7 kg./sq. cm.; no top settling or bottom sediment was found, either at 30° C. or at 80° C.

For the sake of comparison it may be stated that a similar drilling fluid prepared with the same asphalt, which had been heated for 2 hours to 200° C. without a polymerizing reactant, showed a loss of liquid of 0.02 cub. cm./sq. cm. at 30° C. and 7 kg./sq. cm. and of more than 1.1 cub. cm./sq. cm. at 80° C. and 35 kg./sq. cm. Moreover, bottom sediment had been formed both at 30° C. and at 80° C., and the top settling at 80° C. was 0.48.

EXAMPLE III

Some comparative tests were carried out, which showed that oil-base drilling fluids prepared with polymerized asphalt were superior to drilling fluids prepared with blown asphalt.

The blown asphalt and the polymarized asphalt were prepared from the same base material.

In the former case the base material was blown until it had acquired a melting point of 200° C. (Ring and Ball); in the latter case the base material was heated with dinitro cresol, which caused the final product also to have a melting point of 200° C.

A drilling fluid was prepared with each of these asphalts by melting the bitumen, mixing the melted product with the base liquid (oil) and subsequently adding to the mixture a weighting agent (ground chalk).

Both the drilling fluids thus obtained had the following composition: 60% Kuwait gas oil, 30% ground chalk and 10% bitumen. The stability of the drilling fluids was good; the other properties of the drilling fluids are listed in the following table:

*Table I*

| No. of the drilling fluid | Bitumen added | Viscosity in °MM | | Yield value in dynes per sq. cm. | Plastering property at 7 at. gauge on filter paper for 30 min. (A. P. I.), in cub. cm. | | |
|---|---|---|---|---|---|---|---|
| | | Directly after preparation | 16 hours after preparation | | at room temperature | at 80° C. | at 150° C. |
| 1 | blown asphalt | 8 | 12 | 8 | 2.5 | 5.4 | 48 |
| | polymerized asphalt | 11 | 15 | 22 | 2.0 | 4.9 | 8.1 |

From the table it may be seen that at high temperatures (150° C.), drilling fluid No. 2, comprising polymerized asphalt, is definitely superior to drilling No. 1 comprising blown asphalt, especially with regard to plastering properties.

The drilling fluid can also be prepared by mixing the bitumen with a weighting agent, such as calcium carbonate, by grinding the mixture to powder and by suspending the powder at room temperature in the base liquid (oil). It has been found desirable, when doing so, to heat the suspension of powdered bitumen in oil to a temperature approximately equal to or above the melting point of the bitumen, if the plastering properties are to be as good as those obtained with the process described above. This heating, of course, takes places automatically when the drilling fluid is used in deep wells, in which such high temperatures occur.

I claim as my invention:

1. A drilling fluid comprising mineral oil, a finely divided weighting material and a non-oxidized and non-sulfurized polymerized asphaltic bitumen capable of aiding in forming a filter cake on the wall of a well, said bitumen being polymerized by heating for ½ to 8 hours at a temperature from 150° C. to 350° C. in the presence of from 0.25 to 10% by weight of trinitrophenol as a polymerization reactant, said polymerized asphaltic bitumen being present in an amount sufficient to reduce the fluid loss through said filter cake without increasing the viscosity of said drilling fluid to such an extent that it cannot be circulated.

2. A drilling fluid comprising mineral oil, a finely divided weighting material and a non-oxidized and non-sulfurized polymerized asphaltic bitumen capable of aiding in forming a filter cake on the wall of a well, said bitumen being polymerized by heating for ½ to 8 hours at a temperature from 150° C. to 350° C. in the presence of from 1 to 3% by weight of trinitrophenol as a polymerization reactant, said polymerized asphaltic bitumen being present in an amount sufficient to reduce the fluid loss through said filter cake without increasing the viscosity of said drilling fluid to such an extent that it cannot be circulated.

3. A drilling fluid comprising mineral oil, a finely divided weighting material and a non-oxidized and non-sulfurized polymerized asphaltic bitumen capable of aiding in forming a filter cake on the wall of a well, said bitumen being polymerized by heating for ½ to 8 hours at a temperature from 150° C. to 350° C. in the presence of from 0.25 to 10% by weight of a polymerization promoting phenol with an activated OH group as a polymerization reactant, said polymerized asphaltic bitumen being present in an amount sufficient to reduce the fluid loss through said filter cake without increasing the viscosity of said drilling fluid to such an extent that it cannot be circulated.

4. In drilling oil and gas wells, the process of polymerizing an asphalt in the presence of up to 10% by weight of a polymerization promoting phenol with an activated OH group by heating said asphalt and phenol for ½ to 8 hours at a temperature from 150° to 350° C. in the absence of oxygen or sulfur sufficient to react with said asphalt, adding said non-oxidized and non-sulfurized asphalt to a drilling fluid in an amount sufficient to reduce the fluid loss from a well into the surrounding formations without increasing the viscosity of said fluid to such an extent that it cannot be circulated, said drilling fluid having a liquid phase comprising a mineral oil and a solid phase comprising a finely divided weighting material, and circulating said fluid in the well borehole during drilling.

5. The process of claim 4 wherein the polymerization promoting phenol with an activated OH group is trinitrophenol.

6. A drilling fluid comprising mineral oil, a finely divided weighting material and a non-oxidized and non-sulfurized polymerized asphaltic bitumen capable of aiding in forming a filter cake on the wall of a well, said bitumen being polymerized by heating for ½ to 8 hours at a temperature from 150° C. to 350° C. in the presence of from 0.25 to 10% by weight of dinitrocresol as a polymerization reactant, said polymerized asphaltic bitumen being present in an amount sufficient to reduce the fluid loss through said filter cake without increasing the viscosity of said drilling fluid to such an extent that it cannot be circulated.

GORDON KENNETH JONES.

REFERENCES CITED

The following references are of record in the file of this patent:

UNITED STATES PATENTS

| Number | Name | Date |
|---|---|---|
| 2,179,208 | Burk et al. | Nov. 7, 1939 |
| 2,316,968 | Miller | Apr. 20, 1943 |
| 2,350,154 | Dawson | May 30, 1944 |
| 2,360,992 | Weiss | Oct. 24, 1944 |
| 2,370,007 | Carr | Feb. 20, 1945 |
| 2,380,156 | Dobson et al. | July 10, 1945 |
| 2,430,039 | Anderson | Nov. 4, 1947 |
| 2,465,960 | Berge | Mar. 29, 1949 |